(12) United States Patent
Tangren

(10) Patent No.: US 6,246,546 B1
(45) Date of Patent: *Jun. 12, 2001

(54) COINED PARTIAL ETCHED DIMPLE IN A HEAD SUSPENSION AND METHOD OF MANUFACTURE

(75) Inventor: John H. Tangren, St. Paul, MN (US)

(73) Assignee: Hutchinson Technology Incorporated, Hutchinson, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/942,877

(22) Filed: Oct. 2, 1997

(51) Int. Cl.$^7$ .................................................. G11B 5/48
(52) U.S. Cl. ............................................. 360/245.1
(58) Field of Search .................................. 360/104, 105, 360/106; 29/603.04

(56) References Cited

U.S. PATENT DOCUMENTS 5,493,463 * 2/1996 Hagen ................................... 360/104
5,530,606 * 6/1996 Baasch et al. ......................... 360/104

\* cited by examiner

Primary Examiner—George J. Letscher
(74) Attorney, Agent, or Firm—Faegre & Benson LLP (57) ABSTRACT

A magnetic head suspension and method of manufacture of the type having a dimple formed in a surface of the head suspension. The dimple comprises a solid protuberance that is partial etched in a surface of the head suspension and then coined by engaging a socket with the partial etched protuberance to form a convex tip portion. The socket can have a hemi-spherical interior surface to form a hemi-spherical coined partial etched dimple. Alternatively, the socket can have a conical interior surface to form a conical coined partial etched dimple. The dimple can be formed on a slider mounting surface of a flexure to act as a static attitude compensation dimple. Alternatively, the dimple can be formed in a loading region of a load beam or in a cantilever region of the flexure to act as a load point dimple.

11 Claims, 12 Drawing Sheets

COINED PARTIAL ETCHED DIMPLE IN A HEAD SUSPENSION AND METHOD OF MANUFACTURE

TECHNICAL FIELD

The present invention is related to a head suspension for supporting a head slider over a rotating disk in a magnetic data storage device. The head suspension includes a coined partial etched dimple in a surface of the head suspension for providing a gimbal or a load transfer point for the slider.

BACKGROUND OF THE INVENTION

Head suspensions for supporting a head slider over a rotating disk in a magnetic data storage device are in widespread use and are well known. Such head suspensions typically comprise a load beam having a flexure or gimbal at its distal end. A head slider having a read/write transducer is mounted to the flexure. In operation, the rotating disk creates an air bearing on which the head slider floats. The head suspension provides a spring force to counteract the force generated by the air bearing to position the slider at the "fly height." The flexure is sufficiently compliant to allow the head slider to pitch and roll in response to fluctuations in the air bearing created by variations in the surface of the rotating disk. In this manner, the head slider is supported and can be positioned over the disk by an actuator assembly in the drive to access or create information on the disk.

The use of a dimple formed in a surface of a head suspension is also well known. Dimples are frequently used to transfer the spring force generated by the head suspension to the slider, and are used to provide a point about which the slider can gimbal in pitch and roll directions at the fly height. Such dimples are commonly referred to as "load point dimples," and can be formed in a loading region at the distal end of the load beam. A load point dimple formed in the loading region extends from the distal end of the load beam and contacts either a top surface of the slider or a cantilever beam of the flexure to which the slider is mounted. Alternatively, a load point dimple can be formed in the cantilever beam to extend toward and contact the distal end of the load beam.

Load point dimples are typically formed in one of two ways, and the physical structure of the dimple is determined by the method used to form the dimple. A load point dimple can be formed by engaging a shaped punch with a first surface of the component of the head suspension in which the dimple is to be formed. The punch plastically deforms the component to create a dimple having a concave side on the first surface of the component and a convex side on a second surface opposite the first surface of the component. The use of an open through-hole socket or a shaped socket on the second surface of the head suspension component during the punching operation is also known. Alternatively, a load point dimple can be formed by masking and partial etching the surface in which the dimple is to be formed, thus reducing the surface to a uniform thickness and leaving a full-thickness protuberance. In this manner, a solid, generally cylindrical dimple having a planar top surface is formed. Such an etched dimple is shown in the Hagen Patent, U.S. Pat. No. 5,428,490. As stated in the Hagen patent, the edges of the planar surface can be radiused by "spanking" the dimple with a die.

Another type of dimple used in head suspensions is a static attitude compensation dimple. Static attitude compensation dimples are generally formed in the cantilever beam of the flexure. The dimple extends toward the slider mounted to the cantilever beam and contacts the top surface of the slider. The static attitude compensation dimple provides a point about which the slider pivots prior to being permanently mounted to the flexure to compensate for any static attitude misalignments in the head suspension. When properly positioned, the slider is then secured to the flexure, typically by adhesive. Static attitude compensation dimples are generally partial etched in the cantilever beam of the flexure in a manner similar to that described above, and thus have a solid, cylindrical shape. An example of a partial etched static attitude compensation dimple along with a load point dimple formed in a distal end of a load beam is shown in the Jurgenson et al. patent, U.S. Pat. No. 5,636,089.

Dimples such as those described above, however, have certain disadvantages. A head suspension having a dimple formed with a punch and a socket generally has high stress in the transition area between the planar surface of the head suspension and the dimple due to the plastic deformation of the head suspension material. Because such a dimple is "stretched" from the head suspension material during the forming process, high stress regions are created in the structure surrounding the dimple, which in turn can create a bias in the static attitude of the head suspension. Moreover, it is often difficult to accurately form a punched dimple at a desired location due to positioning errors in the dimple punch, thus introducing manufacturing tolerances into the head suspension. Additionally, the convex surface of a punched dimple formed using an open through-hole socket generally "peels" to create a rough outer surface having a series of small plateaus or flat surfaces, which in turn affects the gimballing of the head slider. Partial etched dimples, on the other hand, generally have a more accurate position due to the precise nature of the etching process, but can negatively affect the gimballing of the head slider as the slider rocks back and forth on the planar top surface of the etched dimple. This, in turn, can lead to off track alignment errors in the positioning of the head slider. Finally, whether formed using a punch or by partial etching, conventional tend to wear over time, which decreases the useful life of the head suspension.

There is therefore a continuing need for improved dimples in a head suspension. Specifically, there is a need for a dimple having increased accuracy in the position of the dimple, having a smoother outer surface, and that creates lower overall stress in the head suspension component in which the dimple is formed. A dimple having increased hardness would also be desirable.

SUMMARY OF THE INVENTION

The present invention is a head suspension having an improved dimple formed in a surface of the head suspension. The head suspension is comprised of a load beam having a distal end and a flexure at the distal end of the load beam. The load beam includes a loading region, and the flexure includes a cantilever region and a slider mounting surface. The head suspension further includes a solid dimple having a base portion and a convex tip portion formed in a surface of the head suspension. The dimple is integral with and extends from one of the loading region of the load beam, the cantilever region of the flexure, and the slider mounting surface of the flexure. In one embodiment, the dimple is a load point dimple formed in the loading region of the load beam and extending toward the cantilever region of the flexure. In another embodiment, the dimple is a load point dimple formed in the cantilever region of the flexure and extending toward and contacting the loading region of the load beam. In a third embodiment, the dimple is a static attitude compensation dimple formed in the slider mounting surface of the flexure.

The present invention also encompasses a method of manufacturing a head suspension of the type having a dimple. The head suspension is manufactured by providing a load beam having a loading region at a distal end, providing a flexure having a cantilever region and a slider mounting surface at a distal end of the flexure, and forming a solid dimple having a convex tip portion in a surface of the head suspension. The step of forming the dimple comprises partial etching a solid protuberance in a surface of the head suspension, and engaging the protuberance with a socket to form a dimple having a base portion and a convex tip portion. The dimple can be partial etched in the loading region of the load beam, the cantilever region of the flexure, and/or the slider mounting surface of the flexure.

DETAILED DESCRIPTION OF THE PREFERRED EMBODIMENTS

Figure 1:
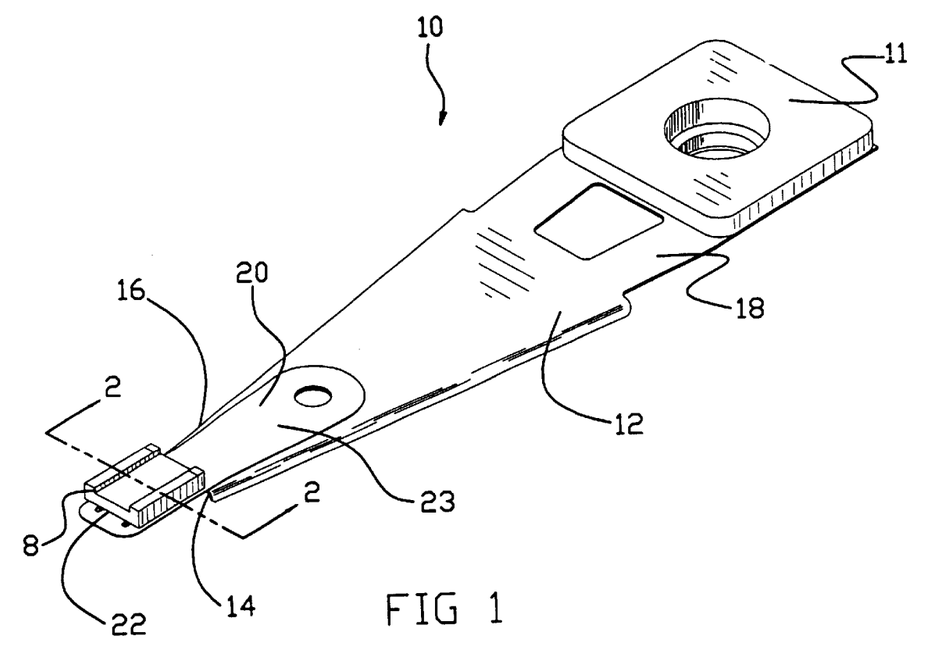
FIG. 1 is an isometric view of a head suspension assembly which can include a dimple in accordance with the present invention.
Figure 2:
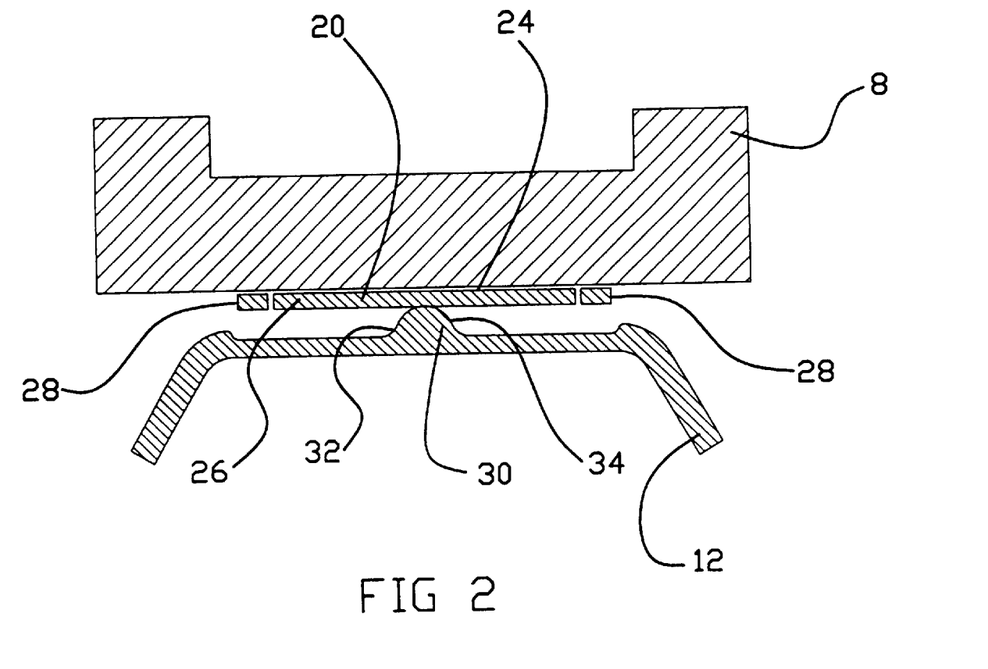
FIG. 2 is a section view of the head suspension assembly shown in FIG. 1 taken along line 2—2 and showing a load point dimple in accordance with the present invention.

FIGS. 1 and 2 show a head suspension 10 in accordance with the present invention and a slider 8 mounted to the end of head suspension 10 for use in a rigid disk drive. Head suspension 10 includes a base plate 11, a load beam 12, and a flexure 20. Head slider 8 is mounted to flexure 20, and head suspension 10 and slider 8 are positioned over a rotating disk (not shown) in the rigid disk drive for reading data from and writing data to the disk.

In the embodiment shown in FIG. 1, load beam 12 includes a spring region 18 and a loading region 14 at a distal end 16 of load beam 12. Flexure 20 is formed as a separate component, and includes a cantilever region 22 and a mounting region 23. Mounting region 23 is mounted to the distal end 16 of load beam 12 using conventional means such as spot welding. Cantilever region 22 includes a beam 26 having a slider mounting surface 24, and arms 28. Slider 8 is mounted to the slider mounting surface 24 using conventional means such as adhesive.

Head suspension 10 provides the necessary support and compliances to properly position slider 8 over the rotating disk in the disk drive. Specifically, spring region 18 generates a spring force to counter the force generated by the air bearing of the rotating disk to position slider 8 at its fly height. Arms 28 and beam 26 of cantilever region 22, on the other hand, resiliently allow slider 8 to gimbal in pitch and roll directions in response to fluctuations in the air bearing. While head suspension 10 of FIG. 1 is shown having a separate flexure 20 mounted to load beam 12, a flexure that is integral with the distal end of the load beam and that provides sufficient compliances to permit the gimballing of the head slider can also be used.

In the embodiment of FIG. 1, and as perhaps best shown in FIG. 2, head suspension 10 includes a load point dimple 30 formed in the loading region 14 of load beam 12. Dimple 30 is a solid protuberance formed in the bottom surface of load beam 12, and extends toward the cantilever region 22 of flexure 20. In the embodiment shown, dimple 30 contacts beam 26 of cantilever region 22, and acts as a transfer point for the spring force generated by spring region 18 to slider 8. In alternative embodiments (not shown), dimple 30 can contact the top surface of the slider attached to the flexure. Dimple 30 also acts as a pivot point about which slider 8 gimbals in pitch and roll directions in response to fluctuations in the air bearing generated by variations in the surface of the rotating disk.

Figure 3:
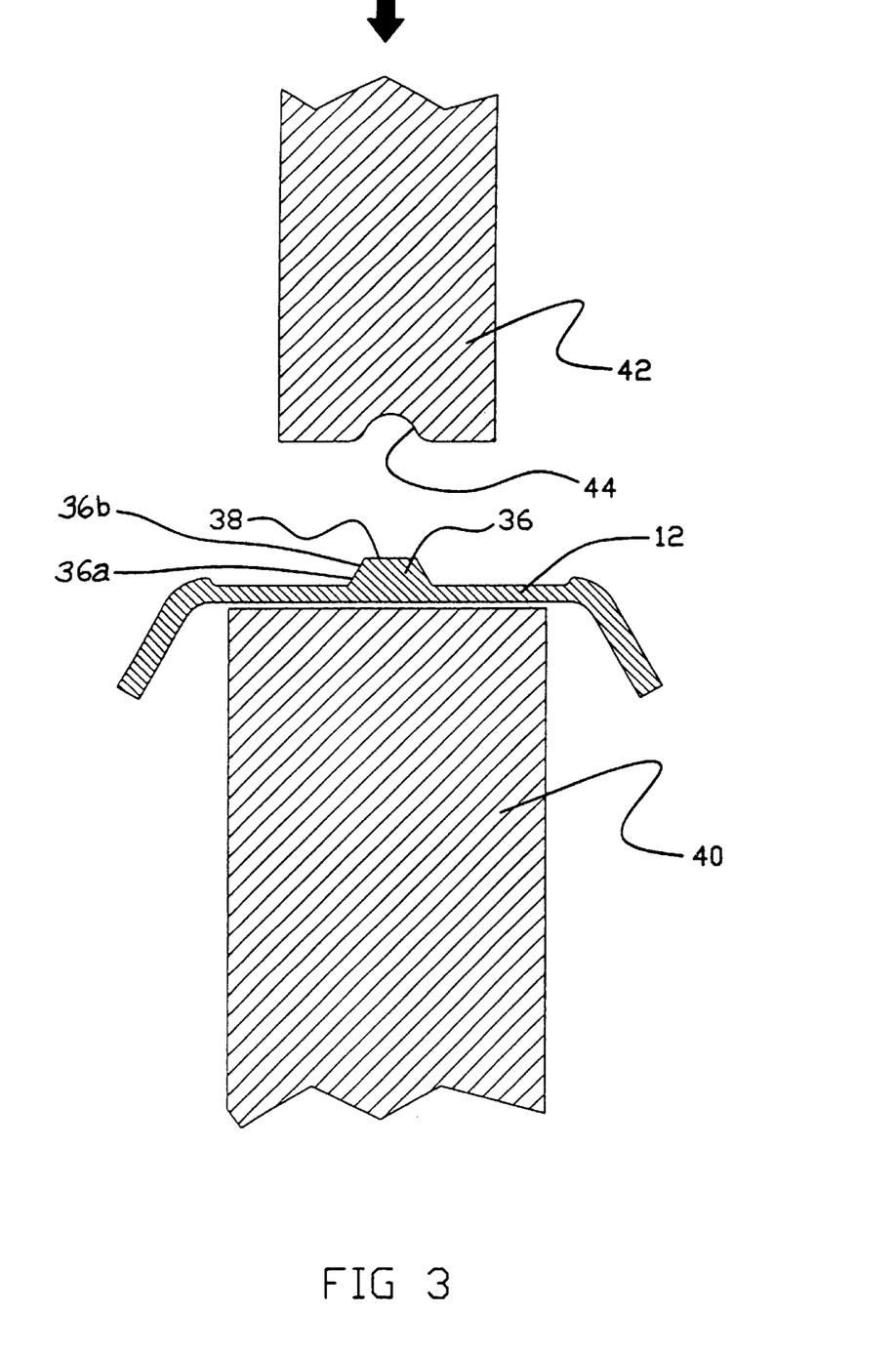
FIG. 3 is a section view of a partial etched protuberance on a head suspension surface and a shaped socket used to engage the protuberance as a step in the process of forming a head suspension dimple.
Figure 4:
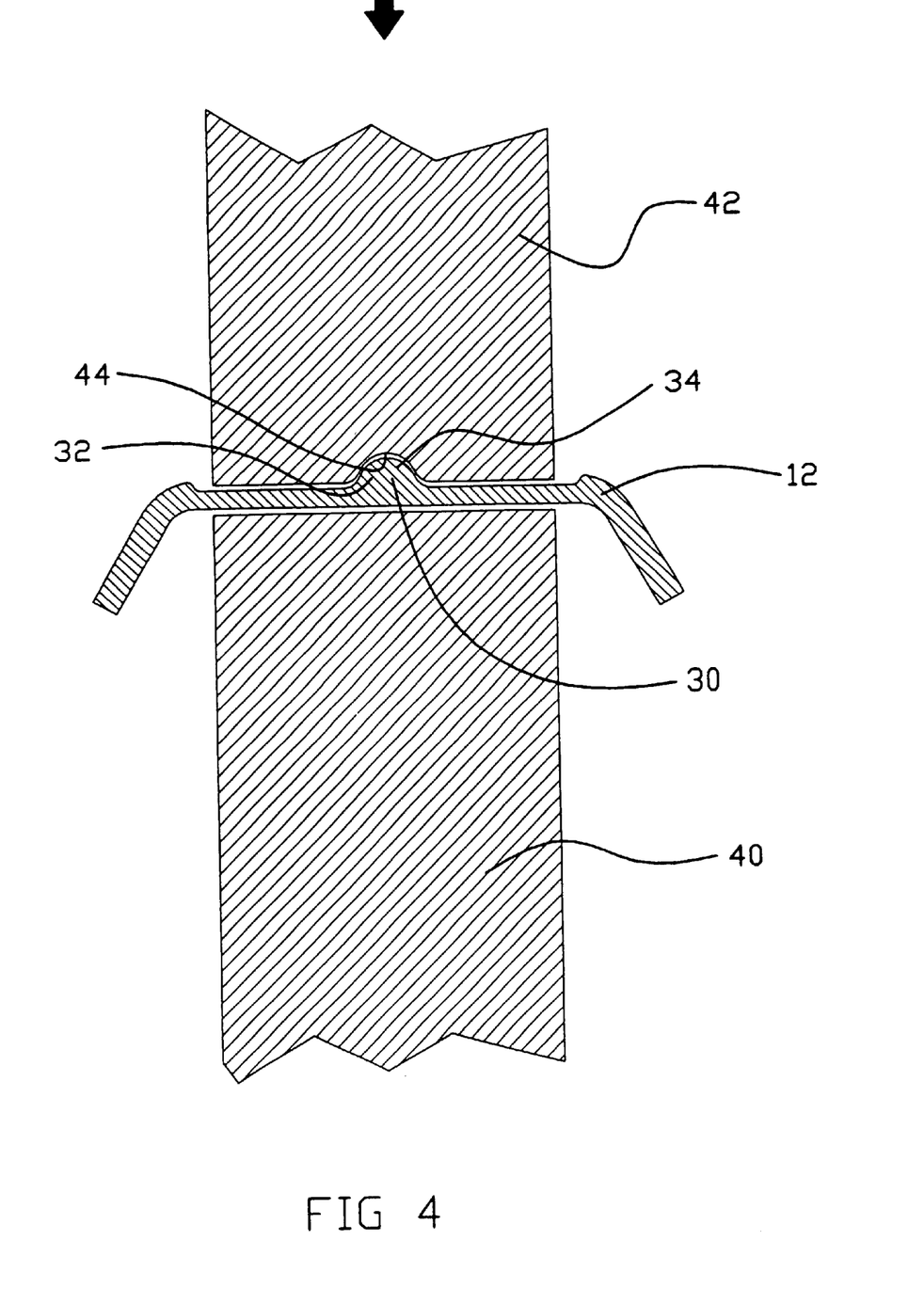
FIG. 4 is a section view illustrating the socket and head suspension shown in FIG. 3, with the socket engaging the protuberance to form a dimple in accordance with the present invention.
Figure 5:
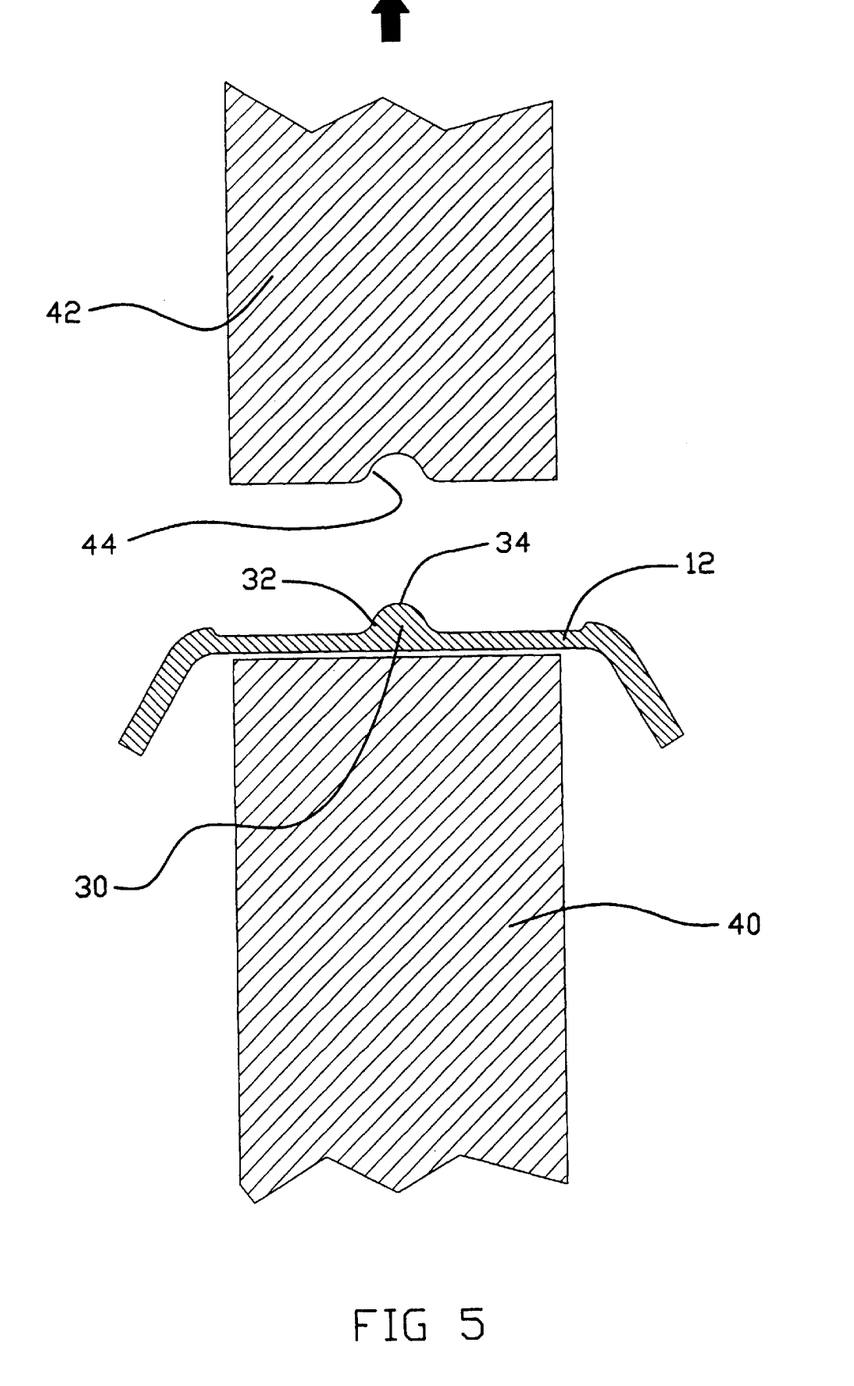
FIG. 5 is a section view illustrating the socket and head suspension of FIG. 3, with the socket being withdrawn from the dimple.

Dimple 30 is solid throughout its entire structure, and includes a base portion 32 and a convex tip portion 34. Dimple 30 is preferably formed using a partial etching and a coining operation. As perhaps best shown in FIGS. 3–5, a solid protrusion 36 can be formed in a conventional manner by masking and partial etching the surface of load beam 12 to uniformly reduce the thickness of the surface and to leave full-thickness protrusion 36. Partial etched protrusion 36 has a base portion 36a and a top portion 36b, and the top portion 36b includes a planar top surface 38. After protrusion 36 is formed in the surface of load beam 12, a clamp block 40 can be positioned opposite the surface of load beam 12 in which partial etched protrusion 36 is created, and as best shown in FIG. 4, a socket 42 having a smooth concave interior surface 44 can be forced into engagement with the planar top surface 38 of partial etched protrusion 36. As socket 42 engages partial etched protrusion 36, a portion of the material in the top portion 36b of protrusion 36 is reshaped and reflowed into the base portion 36a, and planar top surface 38 is shaped to substantially conform to the interior surface 44 of socket 42. In this manner, partial etched protrusion 36 is coined to create solid dimple 30 having base portion 32 and convex tip portion 34. As shown in FIG. 5, socket 42 is withdrawn after the coining operation, leaving dimple 30 created in the surface of load beam 12.

The coining operation described above reshapes the entire protrusion 36 etched in the surface of load beam 12 to form dimple 30. As such, the overall height of dimple 30 as measured from the surface in which dimple 30 is formed to the top of convex tip portion 34 is less than the overall height of protrusion 36 as measured from the surface in which protrusion 36 is formed to the planar top surface 38 of protrusion 36 due to the coining process. This is advantageous in disk drives having reduced spacing between a plurality of disks. Moreover, because the entire protrusion is engaged and reshaped by socket 42, convex tip portion 34 of dimple 30 can be coined into a variety of shapes. In the embodiment shown in FIGS. 4 and 5, the interior surface 44 of socket 42 is hemispherical in shape, and accordingly, convex tip portion 34 of dimple 30 is substantially hemispherical.

By way of example, a typical etched protrusion 36 is substantially cylindrical in shape, and has a diameter of about 46 micrometers. The height of etched protrusion 36 as measured as described above is typically about 25 micrometers. After protrusion 36 is coined by socket 42, however, the resulting coined partial etched dimple 30 has a height measured as described above of about 20 micrometers. The diameter of the base portion 32 of dimple 30 is about 156 micrometers wide, although an accurate measurement of this dimension is difficult to obtain due to the transition of dimple 30 into the surface of the head suspension in which it is formed.

Figure 6:
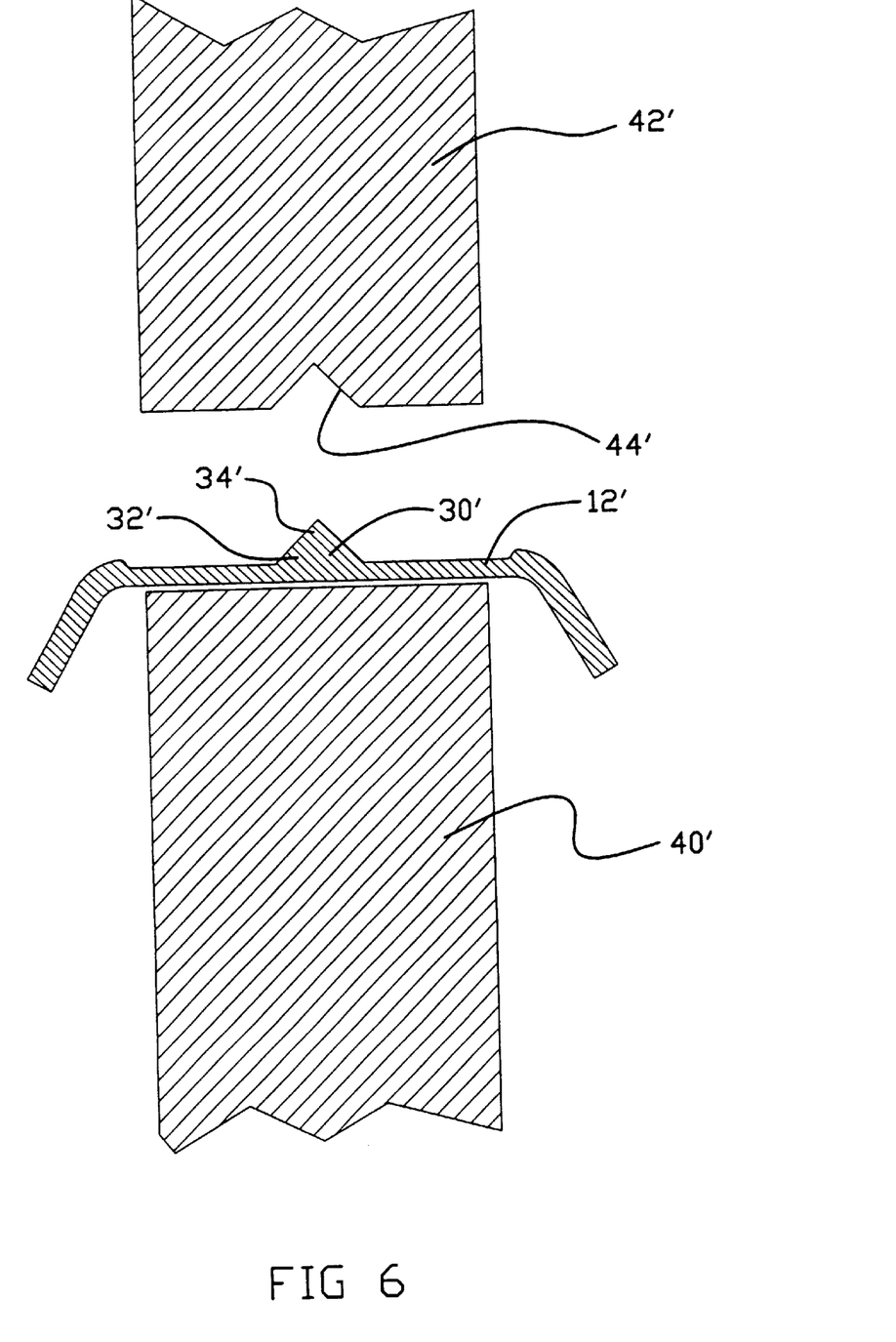
FIG. 6 is a section view of a second embodiment of a dimple in accordance with the present invention on a head suspension surface and a shaped socket used to engage a protuberance to form the dimple.

FIG. 6 shows a second embodiment of a head suspension dimple in accordance with the present invention. Many features shown in FIG. 6 are similar to those shown in FIGS. 1–5 and described above, and similar reference numbers followed by the prime (') symbol are used designate these features. FIG. 6 shows a conical dimple 30' that results from an etching and coining process similar to that described above. Specifically, a partial etched protrusion having a generally planar top surface is formed in load beam 12' in the conventional manner described above. The partial etched protrusion is engaged by socket 42', which has a conically shaped interior surface 44'. Socket 42' is then withdrawn, thus forming conical dimple 30' having a convex tip portion 34' and a base portion 32'.

Figure 9:
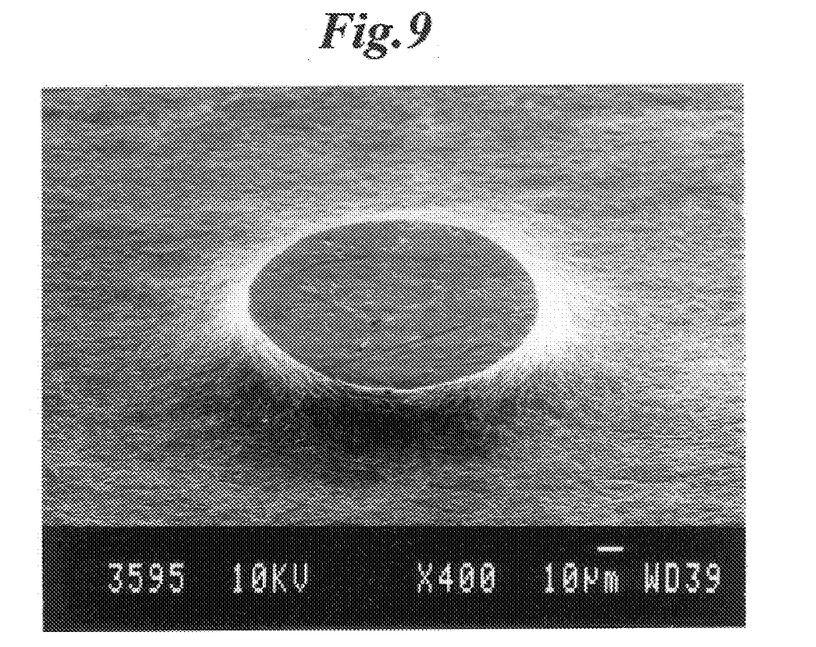
FIG. 9 is a photograph showing an isometric view of a partial etched protrusion in a head suspension.
Figure 10:
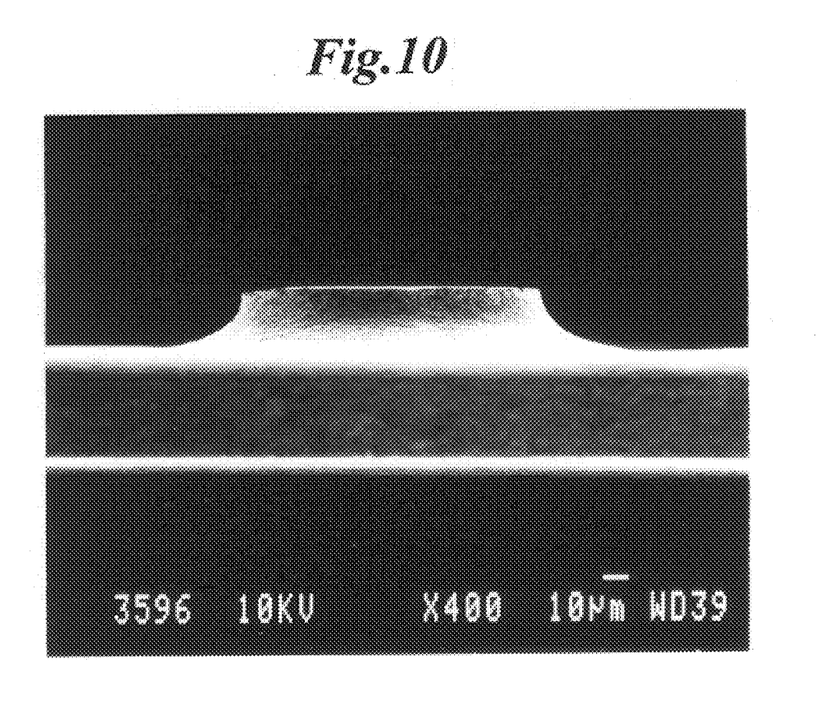
FIG. 10 is a photograph showing a side view of the partial etched protrusion shown in FIG. 9.
Figure 11:
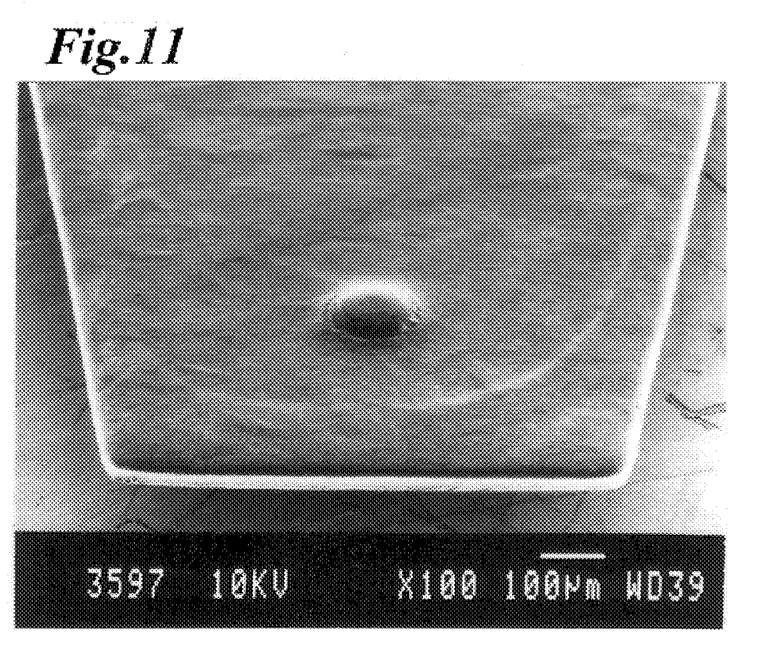
FIG. 11 is a photograph showing an isometric view of a coined partial etched dimple in accordance with the present invention.
Figure 12:
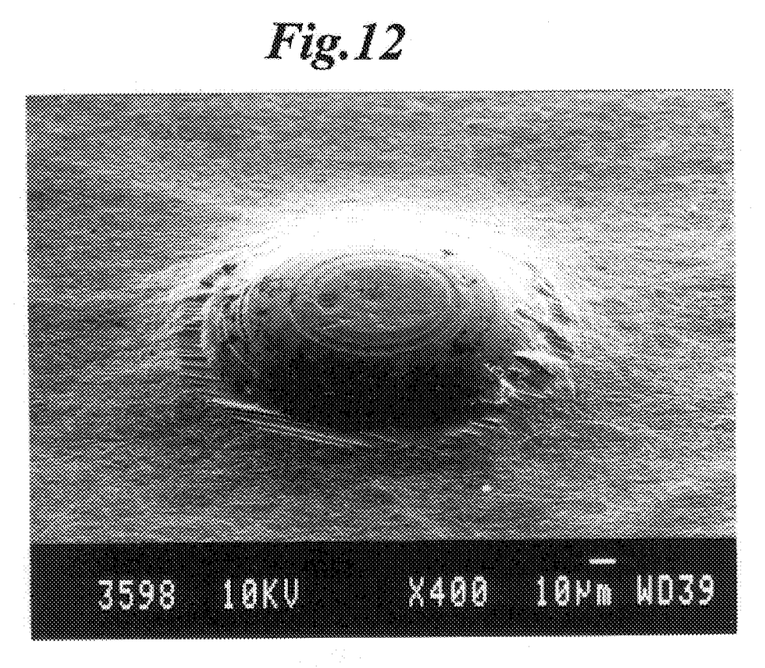
FIG. 12 is a photograph showing a close-up view of the dimple shown in FIG. 11.
Figure 13:
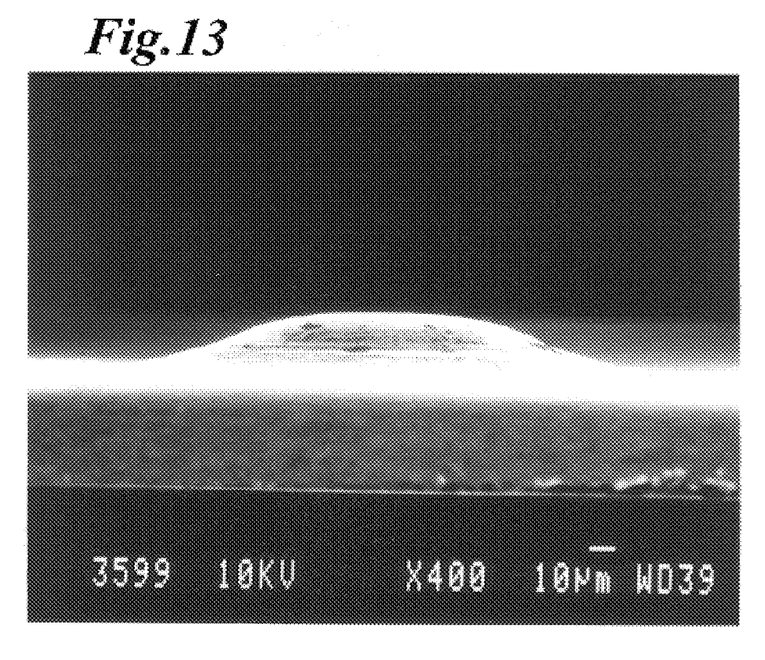
FIG. 13 is a photograph showing a side view of the dimple shown in FIGS. 11 and 12.

FIGS. 9–13 are photographs showing a dimple in accordance with the present invention at the various stages of the forming process described above. Specifically, FIGS. 9 and 10 are photographs showing isometric and side views, respectively, of a partial etched protrusion having a planar top surface formed in a head suspension surface. The partial etched protrusion of these Figures is formed using conventional etching techniques. This protrusion is then coined in the manner described above to create a dimple in accordance with the present invention, and FIGS. 11–13 are photographs showing the finished dimple after the coining operation has been completed. The finished dimple includes a convex tip portion and base portion as described above. As can be clearly seen in these photographs, the convex tip portion of the coined partial etched dimple has a smooth finished outer surface due to the coining operation.

Figure 14:
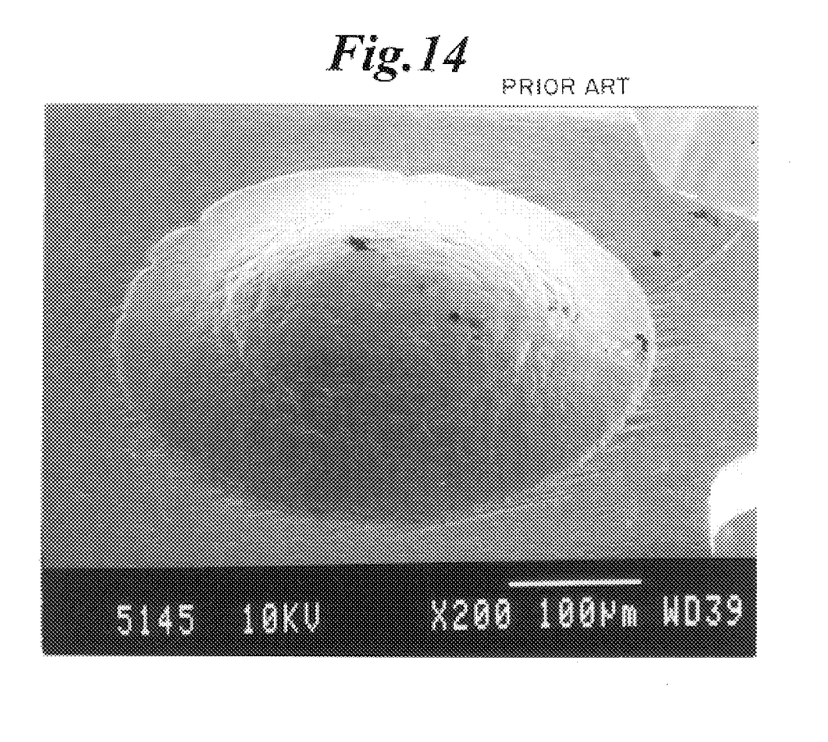
FIG. 14 is a photograph showing a close-up isometric view of a conventional load point dimple formed using a dimple punch and an open socket.
Figure 15:
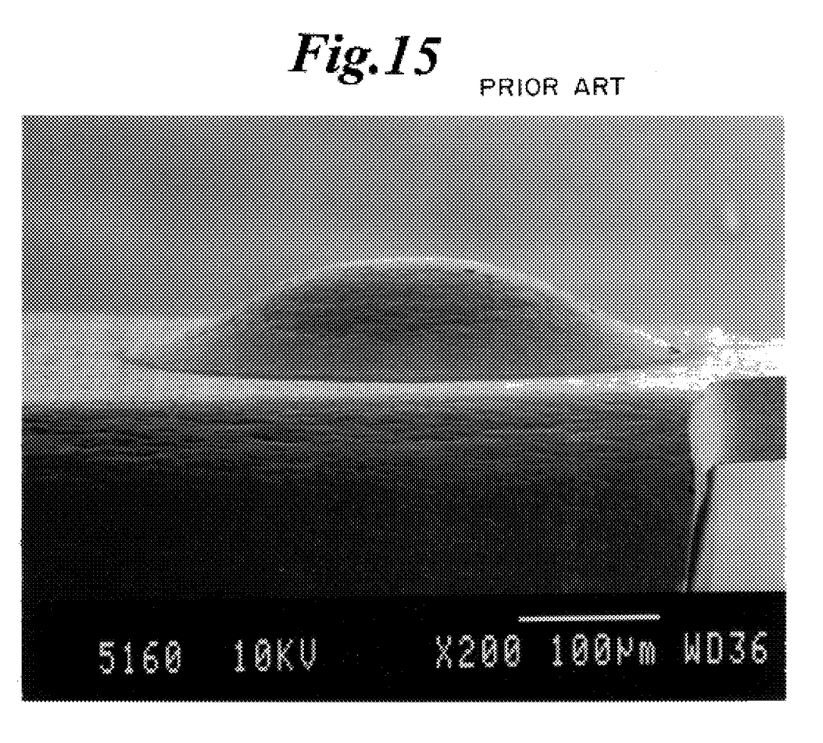
FIG. 15 is a photograph showing a side view of the dimple shown in FIG. 14.

The smooth surface of the coined partial etched dimple of the present invention is particularly apparent when compared to a conventional punched dimple, as is shown in FIGS. 14 and 15. Specifically, FIGS. 14 and 15 present views of a conventional punched dimple from the same angle as the views of the coined partial etched dimple shown in FIGS. 12 and 13, but with slightly reduced magnification due to the difference in size of the dimples. As can be clearly seen, the outer surface of the conventional dimple of FIGS. 14 and 15 is "peeled" and rough, especially as compared to the smooth surface of dimple of the present invention. The smoother dimple surface of the coined partial etched dimple provides a more uniform gimballing surface, which in turn increases the overall performance of the head suspension.

Head suspensions having dimples such as those described and shown above have considerable advantages over conventional head suspensions and dimples. As described in the Background section, the forming of conventional dimples can create high stress regions in a head suspension that affect the static attitude of the head suspension. In addition, conventional dimples can have rough outer surfaces, they can be improperly positioned on the head suspension, and they can create off track errors during the positioning of the slider attached to the head suspension. A dimple in accordance with the present invention, however, overcomes such shortcomings. Because the dimple is initially partial etched from the surface of the head suspension in which it is formed, no additional stress due to plastic deformation of head suspension material is introduced into the head suspension. Because the partial etched protrusion is coined using a shaped socket having a smooth interior surface, the dimple has a smoother convex tip surface than conventional dimples. The smoother surface allows for better gimballing of the head slider due to the lack of small plateaus or flat surfaces on the dimple surface. Because of the precise nature of the partial etching process, the accuracy of the placement of a coined partial etched dimple is much greater than the accuracy of punched dimples. A coined partial etched dimple also provides an improved pivot and transfer point in a head suspension as compared to conventional etched protrusions having a planar contact surface.

Moreover, the coining of a partial etched protrusion allows for the creation of a wide variety of dimple shapes and sizes. Punched dimples are generally limited in shape and size by material constraints—the dimple must be of sufficient height to allow the slider to gimbal about the dimple, yet deforming the head suspension material by too great an amount may fracture the head suspension surface. In addition, as head suspensions become smaller in response to the industry trend toward smaller storage devices, it becomes increasingly difficult to engage the smaller head suspension surfaces to form a dimple. A partial etched protrusion, however, can accurately be formed on smaller surfaces, and can be engaged by a punch having a variety of shapes to create a wide variety of dimples.

One particularly advantageous feature of the present invention as compared to conventional dimples is its increased hardness. As described above, the engagement of the shaped socket with the partial etched protuberance reshapes the entire top portion of the protuberance to conform it to the shape of the socket. As is conventionally known, such a coining process aligns the grain structure of the material of the dimples, which work hardens the outer surface of the dimple. The increased hardness of a coined partial etched dimple leads to less wear of the dimple over time, which in turn increases the useful life of the head suspension.

Figure 7:
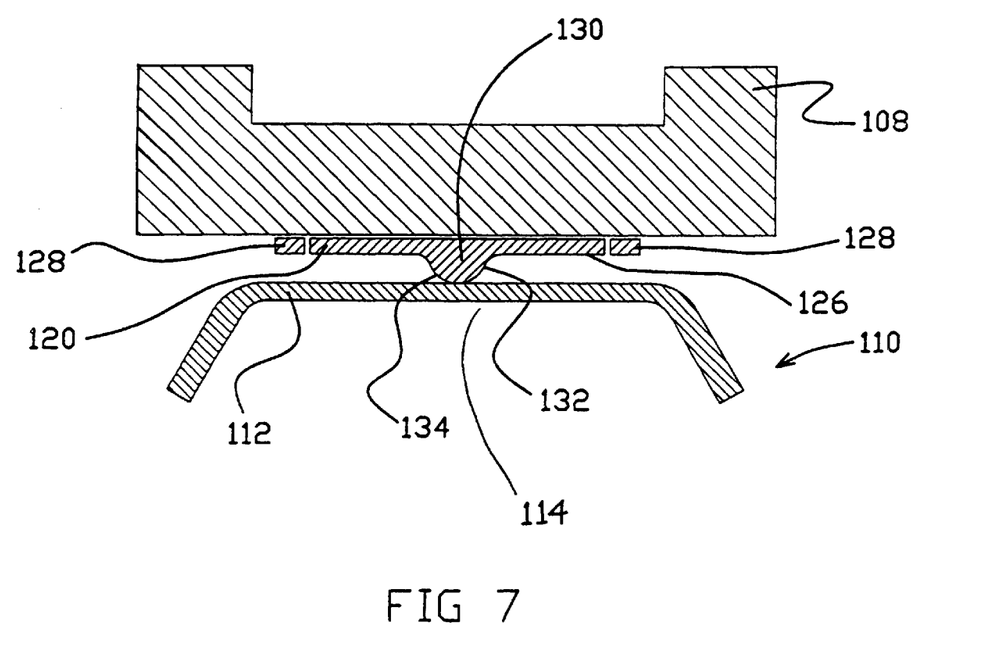
FIG. 7 is a section view of a head suspension assembly in accordance with the present invention having a load point dimple formed in the cantilever beam of the flexure.
Figure 8:
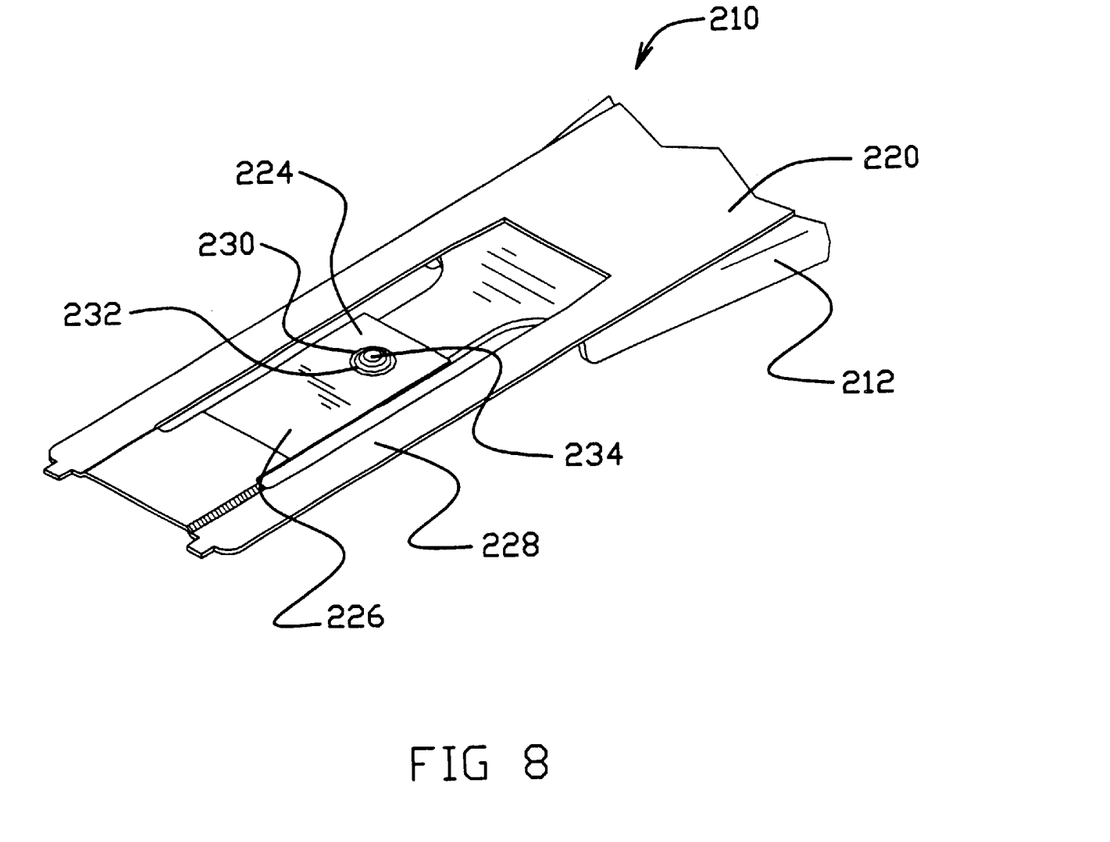
FIG. 8 is a detailed isometric view of the distal end of a head suspension in accordance with the present invention having a static attitude compensation dimple formed in the cantilever region of the flexure.

While FIGS. 1–5 show a dimple formed in a surface of the load beam of a head suspension, a dimple in accordance with the present invention can alternatively be formed in other areas of the head suspension. FIGS. 7 and 8 show such alternative embodiments of the present invention. Specifically FIG. 7 shows a load point dimple 130 formed in a beam 126 of flexure 120 in head suspension 110. Many of the features shown in FIG. 7 are similar to features shown in FIGS. 1 and 2 and described above, and similar reference numbers preceded by the number "1" are used to designate such features. Load point dimple 130 is formed by an etching and coining process similar to that described above. Specifically, a partial etched protrusion is formed in beam 126 of flexure 120, and the protrusion is coined by engaging a socket having a concave interior surface with the protrusion. In this manner, load point dimple 130 is formed in beam 126. Load point dimple extends toward and contacts loading region 114 of load beam 112, and provides a load transfer point for the spring force generated by head suspension 110 and a gimbal point about which a slider can pitch and roll.

FIG. 8 shows a head suspension 210 having a static attitude compensation dimple 230 formed in the slider mounting surface 224 of cantilever beam 226 of flexure 220. Many of the features shown in FIG. 8 are similar to features shown in FIGS. 1 and 2 and described above, and similar reference numbers preceded by the number "2" are used to designate such features. Static attitude compensation dimple 230 is formed using an etching and coining process similar to that described above, wherein a solid protrusion is partial etched in slider mounting surface 224 of beam 226 in a conventional manner. The partial etched protrusion is engaged with a socket having a shaped interior surface to coin the protrusion into dimple 230 having a base portion 232 and a convex tip portion 234. Dimple 230 acts as a point about which a slider can be rotated to compensate for misalignments created in the head suspension 210 during the final mounting of the slider on head suspension 210.

Although the present invention has been described with reference to preferred embodiments, those skilled in the art will recognize that changes may be made in form and detail without departing from the spirit and scope of the invention.

What is claimed is:

1. A method of manufacturing a head suspension for supporting a head slider over a rotating disk in an information storage device, comprising the steps of:
   providing a load beam having a loading region at a distal end of the load beam;
   providing a flexure at the distal end of the load beam, the flexure having a cantilever region and a slider mounting surface; and
   forming a load point dimple that is solid throughout the entire structure of the load point dimple and having a relatively smooth surface in one of the loading region and cantilever region, including the steps of:
      partial etching one of the loading region and cantilever region of the head suspension to form a protuberance having a first height and extending from the one of the loading region and cantilever region, the protuberance having a planar top surface; and
      coining the protuberance by engaging the planar top surface of the protuberance with a socket to reshape the planar top surface of the protuberance so as to be convex at its furthest extension from the one of the loading region and cantilever region.

2. The method of manufacturing a head suspension of claim 1, wherein the step of coining the protuberance to reshape the protuberance includes reshaping the entire protuberance to have a second height that is less than the first height of the protuberance before the step of coining the protuberance.

3. The method of manufacturing a head suspension of claim 2, wherein the step of engaging the planar top surface of the protuberance with a socket includes engaging the protuberance with a socket having an interior hemi-spherical surface to form a hemi-spherical convex tip portion of the load point dimple.

4. The method of manufacturing a head suspension of claim 2, wherein the step of engaging the planar top surface of the protuberance with a socket includes engaging the protuberance with a socket having an interior conical surface to form a conical convex tip portion of the load point dimple.

5. A method of manufacturing a head suspension for supporting a head slider over a rotating disk in a magnetic storage device, comprising the steps of:
   providing a sheet of spring material;
   forming a load beam having a loading region at a distal end of the load beam from the sheet of spring material;
   forming a flexure at the distal end of the load beam from the sheet of spring material, the flexure having a cantilever region and a slider mounting surface;
   partial etching a protuberance that is solid throughout its entire structure and having a planar top surface in one of the loading region of the load beam and the cantilever region of the flexure, the protuberance having a first height; and
   coining the protuberance by engaging the planar top surface of the solid protuberance with a socket to reshape the protuberance and form a load point dimple having a relatively smooth outer surface and having a tip portion that is convex at its furthest extension from the one of the loading region and cantilever region, the load point dimple having a second height that is less than the first height of the protuberance before the step of coining the protuberance.

6. The method of manufacturing a head suspension of claim 5, wherein the step of engaging the protuberance with a socket includes engaging the protuberance with a socket having an interior hemi-spherical surface to form a hemi-spherical convex tip portion of the load point dimple.

7. The method of manufacturing a head suspension of claim 5, wherein the step of engaging the protuberance with a socket includes engaging the protuberance with a socket having an interior conical surface to form a conical convex tip portion of the load point dimple.

8. A method of manufacturing a head suspension having a load beam with a loading region at a distal end, a flexure with a slider mounting surface, and a dimple formed in a planar surface of the head suspension, the step of forming the dimple comprising partial etching a solid protuberance having a first height in a surface of the head suspension and engaging the protuberance with a socket to reshape the protuberance so as to be convex at its furthest extension from the planar surface of the head suspension, the solid dimple having a second height that is less than the first height of the protuberance.

9. The method of manufacturing a head suspension of claim 8, further including forming a load point dimple in the loading region of the load beam.

10. The method of manufacturing a head suspension of claim 8, wherein the flexure of the head suspension has a cantilever region, and the method of manufacturing the head suspension further includes forming a load point dimple in the cantilever region of the flexure.

11. The method of manufacturing a head suspension of claim 8, further including forming a static attitude compensation dimple in the slider mounting surface of the head suspension.

* * * * *